United States Patent [19]

Dambroth

[11] 4,435,951

[45] Mar. 13, 1984

[54] GARDENING DEVICE

[75] Inventor: Jürgen Dambroth, Barsinghausen, Fed. Rep. of Germany

[73] Assignee: Firma Rux GmbH, Barsinghausen, Fed. Rep. of Germany

[21] Appl. No.: 279,903

[22] Filed: Jul. 2, 1981

[30] Foreign Application Priority Data

Jul. 2, 1980 [DE] Fed. Rep. of Germany ....... 3025029

[51] Int. Cl.$^3$ ................................................ A01B 1/24
[52] U.S. Cl. ............................... 56/400.05; 56/400.21
[58] Field of Search ........... 56/400.01, 400.02, 400.04, 56/400.05, 400.06, 400.07, 400.21, 400.08, 400.16; 30/299, 304

[56] References Cited

U.S. PATENT DOCUMENTS

| | | | |
|---|---|---|---|
| 935,473 | 9/1909 | Doidge | 56/400.01 |
| 1,031,688 | 7/1912 | Chase | 56/400.21 X |
| 1,089,542 | 3/1914 | Erwin | 56/400.07 |
| 1,253,355 | 1/1918 | Dalton | 56/400.07 |
| 1,666,374 | 4/1928 | Gatti | 56/400.06 X |
| 2,436,476 | 2/1948 | Kulesh | 56/400.01 X |

*Primary Examiner*—Jimmy C. Peters
*Attorney, Agent, or Firm*—Allison C. Collard; Thomas M. Galgano

[57] ABSTRACT

A gardening device for operating on grass faces includes an operating device which is securable to an elongated handle and which has a plurality of cutting-like faces with conduits therebetween. The cutting-like faces are directed to the grass face to be worked on at an angle ($\alpha$) with respect to the movement direction of the handle.

14 Claims, 6 Drawing Figures

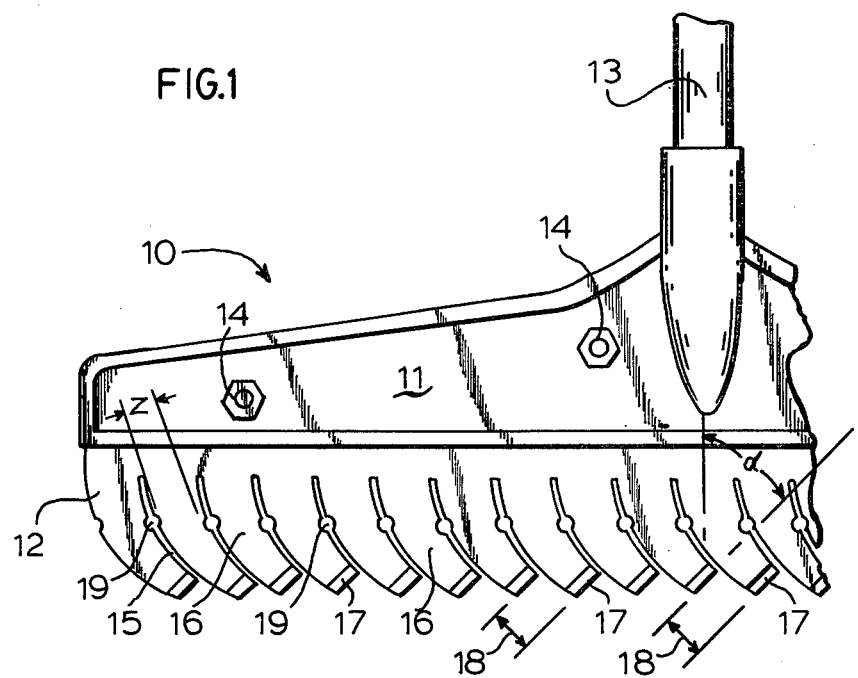
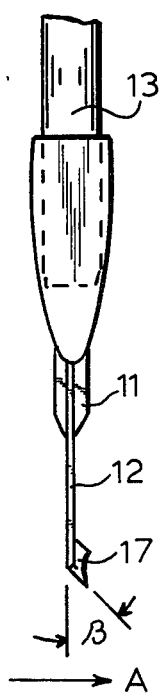
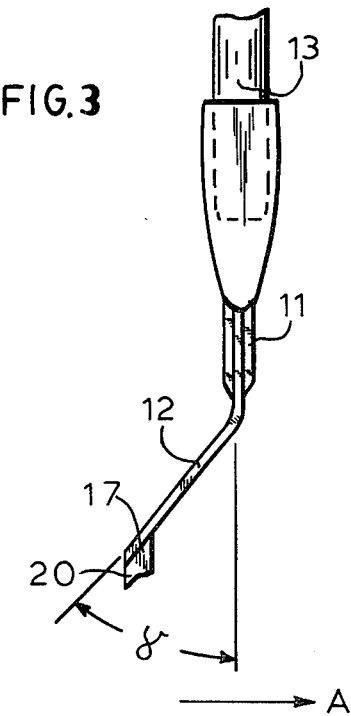

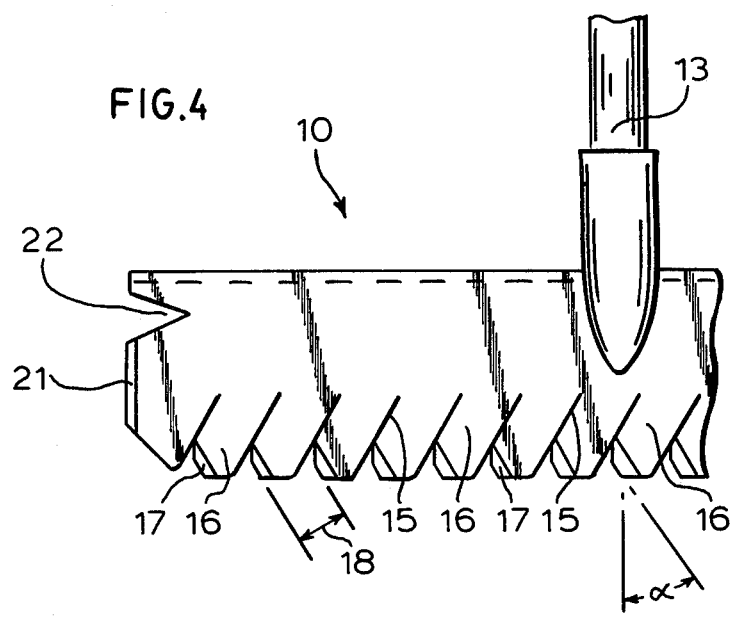
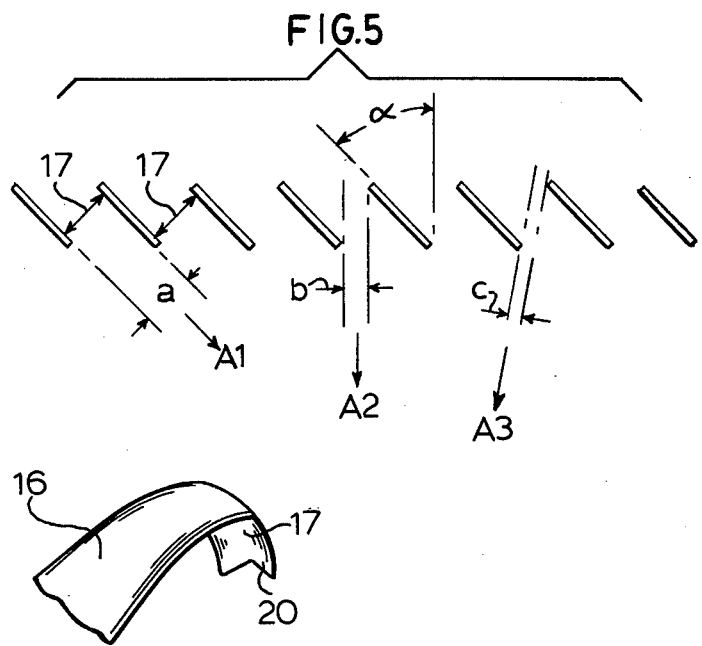

GARDENING DEVICE

The invention relates to a device for gardening. More particularly, it relates to such a device for working on grass faces or the like.

For working and maintaining grass faces or lawns, different devices and tools are known and are being used. In addition to the manual and motor-driven lawn mowers with which the grass is kept at a desired length, airing devices are known for providing air to the grass immediately above the ground to shortly below the ground by providing vertical cuts in the ground. After cutting in the horizontal or vertical direction, the grass must be cleaned from the cut-off grass or plants, for which rakes with fixed or rigid dovetails or grass brooms with strong yielding small blades are used. Obviously, a plurality of more or less expensive devices are required for adequate lawn care.

However, experience has shown that it is not always required to use all of the aforementioned expensive devices for adequate lawn care, especially when the lawn is cared for between the individual grass cuttings with the lawn mower. However, for this purpose, no easy-to-handle devices are known.

Therefore, it is an object of the subject invention to provide a device which permits lawn care without much expense and which is easy to use with no effort.

This object is attained according to the invention by the provision of a device of the aforementioned type which is provided with an operating device on a handle having a plurality of cutting-like faces with conduits therebetween which are directed to the grass face to be worked on at an angle ($\alpha$) with respect to the pulling or movement path or direction of the handle. Due to the cutting-like faces and the conduits formed therebetween, it is possible to change the effective distances of the cutters or the effective throughputs of the conduits depending on how the device is held, so as to vary the intensity of the working or treatment of the grass face with respect to the tearing or the cutting and the raking.

In accordance with a preferred embodiment of the invention, the operating device is composed of a support and a working portion in which cut-outs are provided which form tongues. The tongues are bent toward the grass face and have front ends which form the cutting-like faces. In order to obtain yieldable tongues, the cut-outs are disposed far behind the location of the bend. Furthermore, the tongues are provided with cross-sectional cut-outs for increasing the spring action; the cut-outs or bores extending to the rear portion of the tongues.

It had been shown to be advantageous to provide the cut-outs in the form of circular arches, the front ends of which have a common connecting line (tangent). The angle between the cutting line faces or the conduits and the pulling direction of the handle is about 45°. Advantageously, the front ends of the cutting-like edges facing the grass face are provided with tear tips or they may be serrated.

For an easier removal of the grass remainder from the conduits, the rear edges, as seen in the operating direction of the cutting-like faces, may form an angle of less than 90°, preferably less than 75°, relative to the operating portion.

In order to permit an optimum handling of the device, the lower end of the operating device or the operating portion is deflected at an angle against the operating direction. In the practical operation, it had been shown that a deflection angle of about 30° to 75° with respect to the handle direction is advantageous.

The inventive gardening device may be rendered more versatile if one or both of the outer edges of the operating device are designed as chopper parts. It is also possible to provide wedge-like weed removers on the two outer edges or at one outer edge of the operating device, with which individual weed plants may be gripped and removed.

Other objects and features of the present invention will become apparent from the following detailed description when taken in connection with the accompanying drawings which disclose several embodiments of the invention. It is to be understood that the drawings are designed for the purpose of illustration only and are not intended as a definition of the limits of the invention.

In the drawings, wherein similar reference characters denote similar elements throughout the several views:

FIG. 1 is a fragmentarily-illustrated front elevational view of one embodiment of the inventive gardening device;

FIG. 2 is a side elevational view of the device shown in FIG. 1;

FIG. 3 is a side elevational view comparable to that of FIG. 2, but showing the device provided with a deflected operating portion;

FIG. 4 is a fragmentarily-illustrated elevational view of another embodiment of the inventive gardening device with a rake portion and a weed remover;

FIG. 5 is a plan view of the cutting-like faces of the device; and

FIG. 6 is a fragmentarily-illustrated view of a single tongue with a deflected cutting-like face.

Referring now in detail to the drawings and, in particular FIG. 1 thereof, the actual operating device 10 is mounted on a handle 13 which, in its simplest form, is a straight handle, but may have any given suitable form. In the shown embodiment, the operating device 10 consists of a support portion 11 on which an operating part 12 is exchangeably mounted by means of screws 14. Channel like cut-outs 15 are provided on the operating portion forming tongues 16 on the front end of the operating portion which, if long enough, are elastically yieldable. In order to enhance the yielding or resilient effect, bores 19 may be provided which reduce the cross section of the tongues 16 at a given desired location of the tongues.

The front ends of tongues 16 are deflected obliquely downwardly, i.e., to the grass face, and form cutting-like edges 17 disposed at an angle with respect to handle 13 or generally with respect to the pulling direction of the handle. Between the adjacent faces, conduits or channels 18 are formed which, as can be seen in FIG. 1, are also at an angle with respect to the pulling direction of handle 13.

As can be seen from FIG. 1, the rearward edges of face 17 should form an angle ($\beta$) with respect to the operating portion 12 which is less than 90°, preferably less than 75°; this allows for a better wiping of the grass and plant remainders from the cutting edges 17 or from conduits 18.

From the side view of the operating device in accordance with FIG. 3, the deflection of the operating device 12 against the operating direction A at an angle ($\gamma$) with respect to handle 13 can be seen. The tear tips 20 on the cutting-like faces 17 are also shown.

The operating device 10 shown in FIG. 4 is principally the same as that shown in FIG. 1. However, this device is provided with a rake portion 21 on one of the shown outer edges, as well as a weed remover 22, which enables one to take care of the grass edges with the inventive gardening device, in addition to taking care of the lawn.

FIG. 5 shows a series of cutting-like faces 17 in a plan view. When the device is moved in the direction A1, the edges of the face 17 cut along their longitudinal direction. The cutting effect is very good and the conduits a are completely open with respect to their operating direction. During the operating direction A2, i.e., in the pulling direction of handle 13, the conduits b are reduced so that they comb out smaller materials. In the operating direction A3, the conduits c are very small so that a face-like raking is made possible, similar to a grass broom.

As shown in an enlarged view in accordance with FIG. 6, the lower edges of the cutting-like faces 17 may be provided with special cutting tips or with a plurality of serrations or may be shaped in any other advantageous manner.

Thus, while only several embodiments of the present invention have been shown and described, it will be obvious that many changes and modifications may be made thereunto, without departing from the spirit and scope of the invention.

What is claimed is:

1. A multi-purpose gardening tool for operating on grass faces which is securable to an elongated handle, comprising:

an operating device having an elongated support portion which is securable to an elongated handle and which has a longitudinal axis oriented in a generally perpendicular disposition relative to the axis of said handle and a tool portion composed of a plurality of tongues separated by channel-like cut-outs, the free ends of which define cutting-like linear faces all of which faces are parallel to each other and are directed to the grass face to be worked on and are disposed at an angle ($\alpha$) with respect to a plane passing through the axis of the handle and the normal movement direction of the handle, said linear tongue faces also being generally arranged at an angle to a plane passing through said handle axis and said support portion axis.

2. The gardening tool according to claim 1, wherein said cut-outs are arcuately shaped, the front ends of which lie in a common connecting line.

3. The gardening tool according to claim 1, wherein the angle ($\alpha$) between the cutting-like faces and the movement direction of the plane of the normal handle is about 45°.

4. The gardening tool according to claim 1, wherein said cutting-like faces have front ends facing the grass face which are provided with tear tips.

5. The gardening tool according to claim 1, wherein said cutting-like faces have front ends facing the grass which are serrated.

6. The gardening tool according to claim 1, wherein said cutting-like faces have rear edges, as seen in the operating direction of the cutting-like faces, which form an angle ($\beta$) of less than 90°, with the operating portion.

7. The gardening tool according to claim 1, wherein said device has at least one outer lateral edge designed as a chopper part.

8. The gardening tool according to claim 1, additionally including at least one wedge-like weed remover provided on at least one outer lateral edge of said operating device.

9. A multi-purpose gardening tool for operating on grass faces which is securable to an elongated handle, comprising:

an operating device including an elongated support portion and a tool portion, said support portion securable to an elongated handle which has a longitudinal axis oriented in a generally perpendicular disposition relative to the axis of said handle, said tool portion comprised of a plurality of tongues bent toward the grass face and separated on channel-like cut-outs located rearwardly of said bends in said tongues, the free ends of which define cutting-like linear faces directed to the grass face to be worked on and disposed at an angle ($\alpha$) with respect to a plane passing through the axis of the handle and the normal movement direction of the handle, said linear tongue faces also being generally arranged at an angle to a plane passing through said handle axis and said support portion axis.

10. The gardening tool according to claim 9 wherein said tongues are provided with cross-sectional cut-outs for increasing their spring action.

11. The gardening tool according to claim 9 or 4, wherein said tongues have rear portions provided with said cut-outs.

12. The gardening tool according to claim 9, wherein the lowermost portion of said operating device is deflected at an angle ($\gamma$) against the operating direction.

13. The gardening tool according to claim 12, wherein said deflection angle ($\gamma$) is about 30° to 75°.

14. A multi-purpose gardening tool for operating on grass faces which is securable to an elongated handle, comprising:

an operating device including an elongated support portion and a tool portion, said support portion securable to an elongated handle which has a longitudinal axis oriented in a generally perpendicular disposition relative to the axis of said handle, said tool portion comprised of a plurality of tongues bent toward the grass face and separated by channel-like cut-outs located rearwardly of said bends in said tongues, the free ends of which define cutting-like linear faces directed to the grass face to be worked on and disposed at an angle ($\alpha$) with respect to a plane passing through the axis of the handle and the normal movement direction of the handle, said linear tongue faces also being generally arranged at an angle to a plane passing through said handle axis and said support portion axis, said cutting-like faces having rear edges, as seen in the operating direction of the cutting-like faces, which form an angle ($\beta$) of less than 75°, with the tool portion.

* * * * *